No. 815,335. PATENTED MAR. 20, 1906.
T. F. DEXTER.
AUTOMATIC STEAM AND WATER TRAP FOR STEAM HEATING SYSTEMS.
APPLICATION FILED MAY 11, 1905.
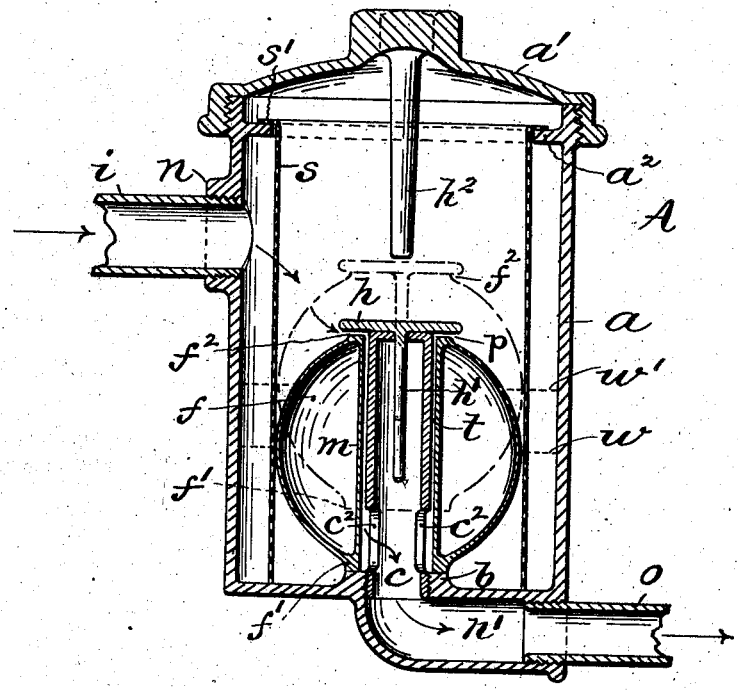
WITNESSES.
INVENTOR.
Thomas F. Dexter.

UNITED STATES PATENT OFFICE.

THOMAS F. DEXTER, OF PROVIDENCE, RHODE ISLAND.

AUTOMATIC STEAM AND WATER TRAP FOR STEAM-HEATING SYSTEMS.

No. 815,335.

Specification of Letters Patent.

Patented March 20, 1906.

Application filed May 11, 1905. Serial No. 259,968.

*To all whom it may concern:*

Be it known that I, THOMAS F. DEXTER, a citizen of the United States of America, and a resident of Providence, in the county of Providence and State of Rhode Island, have invented certain new and useful Improvements in Automatic Steam and Water Traps for Steam-Heating Systems, of which the following is a specification.

My invention relates to certain novel improvements in automatic steam and water traps adapted to be located in the return circulation-piping of steam-heated radiators; and it consists, essentially, in the combination of a casing forming the trap-chamber provided with open inlet and outlet passages, a central tubular member in direct open communication at the bottom with said outlet-passage and having side openings therethrough, a movable valve fitted in or on the upper end of said tube, and a metallic float member slidably mounted on and inclosing the tube, the float when in its lowest or normal position forming a continuously-closed seat at the bottom and at the same time having a continuous slightly-open seat at the top for the flow of a limited quantity of steam or air from the trap-chamber downwardly through the center of the float and tube into the outlet-passage, all as more fully hereinafter set forth and claimed.

My improved trap when in use is interposed in and piped to the discharge or outlet connection of the radiator, so that the waste or water of condensation in the latter is conducted to and from the trap to the vacuum-pump in the circulation system or is discharged into the atmosphere as desired. The interior construction of the trap is such that in starting the circulation the cold air is forced through a small normally open passage at the top of the then stationary or seated float and downwardly therethrough into the pipe leading, say, to the circulating-pump, said open passage being sufficiently contracted, so as not to admit air or vapor enough to break the vacuum. The water (due to condensation of steam in the radiator) which follows the air is screened in the trap-chamber and rises therein until its increasing volume and buoyancy operates to gradually lift the float from the bottom seat, at which instant the float automatically closes the said small open air-passage at the top, the water itself in the chamber meanwhile flowing unobstructedly through the then uncovered bottom opening or discharge-passage into the circulating-pipe. When the water in the trap falls to the normal level again, the correspondingly-descending float will automatically close the bottom or outlet passage and open the top one, the device working automatically and intermittingly, corresponding to the volume of water entering the trap. A stop may be used to limit the upward movement of the float.

In the accompanying drawing, which represents a vertical central sectional view of my improved trap A, the body or casing $a$ thereof is cylindrical and is provided at or near the top with an inlet-nozzle $n$ and at the bottom with an outlet-nozzle $n'$, said nozzles being tapped to receive the pipes $i$ and $o$, respectively. The base has a central seat $b$, having a vertical opening in its center leading directly to the nozzle $n'$. Integral with or screwed into said seat is a vertical tube $c$, closed at its upper end and provided with suitable side openings $c^2$ therethrough located at its lower end.

The float member $f$ is hollow and made of suitable metal. It has a straight tube or annular partition $m$ extending vertically through its center, its upper and lower ends being faced off to form flat surfaces or seats $f^2 f'$, respectively. The said stem or tube $c$ constitutes a central support and guide for the float, at the same time forming a small annular space $t$ between the adjacent surfaces of the parts $m$ and $c$, as clearly shown. A valve or cap $h$ rests upon the closed top of tube $c$ when the float is normally seated and is provided with a central guide-stem $h'$, passing downwardly through said top end. The latter extends slightly above the upper surface or end $f^2$ of the float and forms a small normally open passage $p$, communicating with said space $t$, openings $c^2$, and outlet $o$. A vertically-arranged removable screen or perforated cylinder $s$ surrounds the float, its upper end being turned outwardly to form a flat flange $s'$, in turn resting upon the inner annular flange $a^2$ of the casing. The trap is also provided with a removable cover $a'$, secured to the casing and, as drawn, having a downwardly-extending central stem $h^2$, the lower end of the latter being adapted to engage with and limit the vertical movement of the float and valve $h$.

The action of my improved trap A may be described as follows, assuming the inlet and outlet pipes $i$ and $o$ to be suitably connected with a radiator and circulating-piping of a heating system: The float $f$ when in its normal position, as represented in the drawing, permits a limited quantity of air, &c., to freely pass via pipe $i$, screen $s$, passage $p$, space $t$, and openings $c^2$ of tube $c$ into the discharge-pipe $o$. As the succeeding water or condensed steam from the radiator flows into the trap-chamber it gradually rises therein, say, to a level $w$, or to a point where its buoyancy will lift the float and uncover the bottom seat $b$, at which instant the water will pass unobstructedly through said side openings $c^2$ into the nozzle $n'$ and pipe $o$. The outflowing water quickly lowers its level and allows the float to again seat itself by gravity action, the operation being intermittently repeated while the supply of water from the radiator is kept up. At substantially the instant that the float rises it engages the under side of valve $h$, thereby automatically closing the top inlet-passage $p$. The dotted lines indicate an extreme lift of the float in case the water-level rises, say, to $w'$, the rising float at the same time engaging with and carrying the valve upwardly until arrested by the stop $h^2$. The movable members automatically return to the bottom or normal position when the water in the trap is sufficiently reduced or lowered, substantially as before described.

I claim as my invention—

1. In a trap of the class described having a closed casing provided with suitably-disposed inlet-passages, and an outlet or discharge passage located in the base of the casing, the combination therewith of a suitably-guided vertically-movable interior float member normally seated on said base and surrounding said outlet-passage, the said float having a vertically-arranged opening therethrough communicating with the said outlet, and a suitably-supported vertically-movable valve disposed at the top of the float and forming between the adjacent surfaces thereof a small normally open passage for the inflow of air from the chamber via the float into the discharge-outlet, arranged whereby water accumulating in the trap causes the float to rise and close said air-passage and at the same time uncovers the bottom seat to permit the water to freely escape into the discharge-outlet.

2. The improved trap substantially as described, the same comprising a closed casing having inlet and outlet openings, an interior vertically-arranged apertured central tube mounted in the base of the casing and in open communication at the bottom with said outlet, a movable valve located at the upper end of the tube, a vertically-movable float surrounding the tube and normally seated on said base, a normally open narrow passage $p$ formed between the adjacent surfaces of the upper end of the float and said valve and communicating with the discharge-passage, and a screen interposed between the side walls of the casing and the exterior of the float, substantially as described.

3. The improved steam and water trap A, the same consisting of the chambered casing $a$, cap $a'$ secured thereto, inlet and discharge openings, the latter being formed in the base of the casing, and a removable screen $s$, in combination with the vertical tube $c$ closed at its upper end and being in direct communication at the bottom with said discharge-opening, lateral apertures $c^2$ in said tube, a metallic float $f$ surrounding the tube and normally seated on said base, a guided valve $h$ normally resting upon the top of tube $c$ and forming between it and the float a passage $p$ communicating with the discharge-opening, and a stop for limiting the vertical movement of the float and valve members, all constructed, arranged and adapted for operation, substantially as herein described and for the purpose set forth.

4. In a trap provided with an inlet-passage, a continuously-open discharge-outlet in its base and a suitably-supported valve located in the interior of the trap, the combination therewith of a guided normally stationary float having an opening therethrough and interposed between said base and valve and forming a small opening at the top between the valve and float, which opening is automatically closed by the rising float when sufficient water accumulates in the trap, thereby at the same time uncovering the bottom or discharge outlet for the free escape of the said water.

Signed at Providence, Rhode Island, this 9th day of May, 1905.

THOMAS F. DEXTER.

Witnesses:
 GEO. H. REMINGTON,
 C. E. PRICE.